United States Patent [19]

Takagi

[11] 4,066,278
[45] Jan. 3, 1978

[54] STABILIZER ASSEMBLY FOR USE IN VEHICLES

[76] Inventor: Tatsuya Takagi, 6-10 Araebisumachi, Nishinomiya, Hyogo, Japan

[21] Appl. No.: 649,611

[22] Filed: Jan. 16, 1976

[30] Foreign Application Priority Data

Aug. 23, 1975   Japan .................................. 50-102429

[51] Int. Cl.² ............................................. B60G 11/64
[52] U.S. Cl. ...................................... 280/710; 267/57; 188/312
[58] Field of Search ....................... 280/695, 700, 710; 267/57; 188/312, 317, 282

[56] References Cited
U.S. PATENT DOCUMENTS

| | | | |
|---|---|---|---|
| 3,218,053 | 11/1965 | Shreve | 267/57 |
| 3,368,697 | 2/1968 | Carlson | 188/312 |
| 3,483,952 | 12/1969 | Cardwell | 188/312 |
| 3,879,051 | 4/1975 | Kolbe | 267/57 |

*Primary Examiner*—Philip Goodman

*Attorney, Agent, or Firm*—Birch, Stewart, Kolasch and Birch

[57] ABSTRACT

A stabilizer assembly including a torsion bar twistably mounted on the frame of a vehicle and a slidable braking device provided at one end or both ends of the torsion bar. The slidable braking device comprises two members which are slidable relative to each other, one member being secured to the end of the torsion bar and the other member being secured to the lower arm in a suspension system of the wheel. The sliding braking device is arranged to move when its predetermined resistance is less than, and thus is overcome by the spring-back force due to the distortion of the torsion bar. Thus, the initial distortion of the torsion bar has no effect upon the stabilizing action unless the resultant spring-back force exceeds the predetermined frictional resistance. The stroke of the slidable braking device is limited to about 15 mm from a neutral position. This limited stroke overcomes the unevenness in the road surface, and produces a roll angle of about 1°, which does not affect the vehicle very much when running under heavy turning conditions.

9 Claims, 6 Drawing Figures

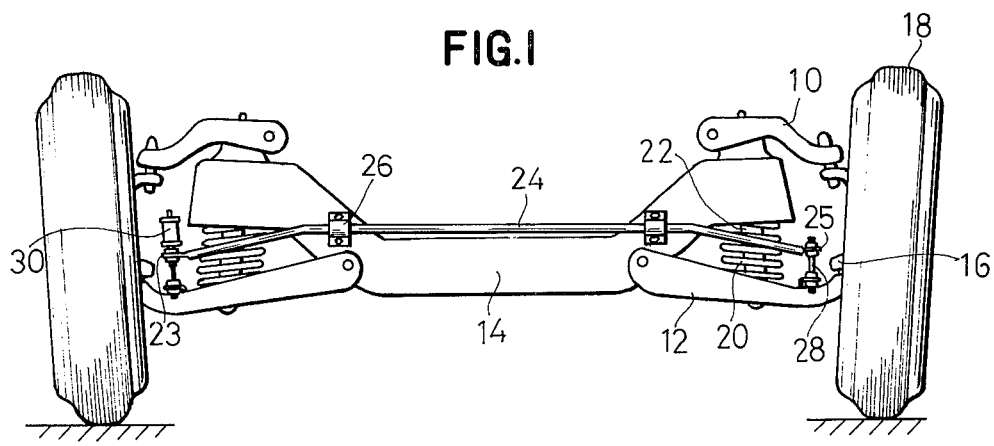
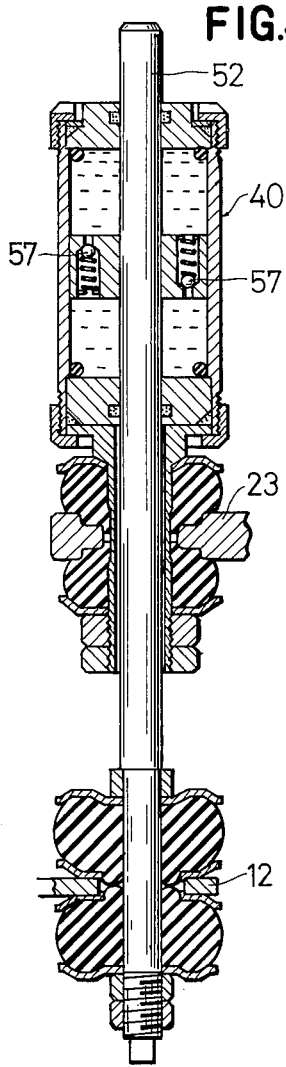
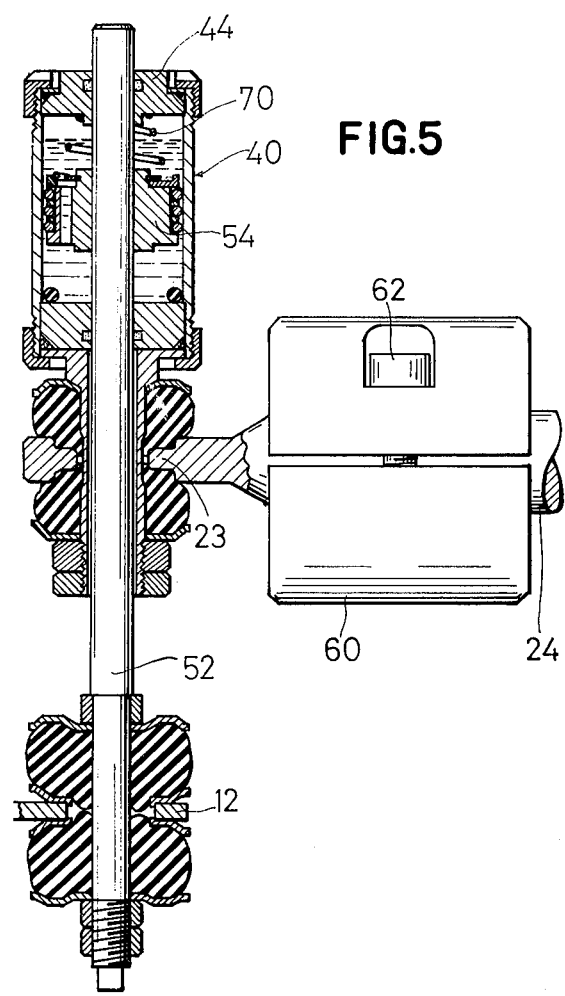

STABILIZER ASSEMBLY FOR USE IN VEHICLES

BACKGROUND AND SUMMARY OF THE INVENTION

The present invention relates to an improved stabilizer assembly for use in vehicles, especially in passenger vehicles, and more particularly to a novel slidable device interposed between a torsion bar in the assembly and moving parts of a suspension member of a wheel.

Most passenger vehicles make use of the so-called "independent suspension system for wheels" in which both of the wheels behave independently of each other. This is designed with the purposes of restraining rolling of the vehicle and gaining high performance for road holding and straight running. Heretofore, a passenger vehicle, e.g., an automobile, has been provided with a stabilizer assembly of the type in which a U-shaped torsion bar has its central portion twistably mounted on the frame of the automobile and the opposite ends thereof are secured to the lower arms of a suspension system for the wheels. The stabilizer acts in a manner such that, when a pair of right and left wheels differ in level from each other, the car will be prevented from excessive "rolling" or inclination to either side by the torsional resistance produced in the torsion bar. At the same time, stabilizer assemblies are also required to have stronger or more rigid torsion bars in order to meet the requirements of high-speed operation. However, right and left wheels influence each other through the intermediary of the torsion bar in a stabilizer assembly so that a stronger or more rigid torsion bar will result in many disadvantages. One of the disadvantages is that in the case where a wheel passes over a hole in the road during a straight-running operation, a stronger torsion bar would prevent the wheel from completely falling into the hole, producing as a consequence, a poor road-holding characteristic. In this situation, rolling would also be more amplified in the case of a stronger torsion bar rather than in the case where a stabilizer is not utilized. Another disadvantage is that when a wheel passes over a raised location during a straight-running operation, rolling would be more amplified than in the case where a stabilizer is not utilized and the road-holding feature of the other wheel is lowered by the torsional resistance in the torsion bar, also resulting in poor straight-running performance. Accordingly, there is a demand for an improved stabilizer assembly wherein the aforementioned disadvantages are eliminated.

Accordingly, an object of the present invention is to provide an improved stabilizer wherein a slidable braking device is provided for controlling a torsion bar in a manner that it rarely or only slightly acts when a vehicle runs in a straight path but effectively acts when a vehicle turns.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, an improved stabilizer is provided, said stabilizer having a torsion bar twistably mounted on the frame of a vehicle. The stabilizer assembly includes a slidable braking device provided at least at one end of the torsion bar. The slidable braking device has one portion thereof secured to an end of the torsion bar and the other portion thereof fixed to the lower arm of a suspension system. The two portions are slidable relative to each other, the stroke of which is limited to a length smaller than the maximum twistable amplitude of the end of the torsion bar. Advantageously, the stroke may vary about 10 mm to 20 mm from the neutral position.

In one embodiment of the present invention, the slidable braking means is of a friction-damper type having a cylinder and piston member secured to the end of the torsion bar and the lower arm of a suspension system. The piston is reciprocal along and within the oil-filled cylinder portion, while the oil is flowable through a hole bored in the piston between upper and lower chambers defined by the piston. The piston has a plurality of piston rings fitted in its side circumference, so that a frictional force or resistance acts against any slide movement thereof resulting from the distortion of the torsion bar. The static friction of the slidable braking device is arranged so as to counterbalance the spring-back force produced in a torsion bar subjected to a preselected amount of deformation.

A hydraulic oil damper is also available instead of the abovementioned friction damper as the slidable braking device. The slidable braking device can be used at one end or at both ends of the torsion bar. In the case of each end type, a weight or the like can be added to each end of the torsion bar, and a spring is interposed between the piston and cylinder portions for normally maintaining a neutral position.

BRIEF DESCRIPTION OF THE DRAWINGS

The present invention will become more fully understood from the detailed description given hereinbelow and the accompanying drawings which are given by way of illustration only, and thus are not limitative of the present invention, and wherein, FIG. 1 is a schematic view of a relevant portion of a vehicle showing a stabilizer of the present invention provided in an independent suspension system for the front wheels;

FIG. 4 is an elevation, in section, of a slidable braking device of the hydraulic oil damper type; and FIGS. 5 and 6 are views similar to that of FIG. 3 showing two modifications of the slidable braking means of the dynamic damper type according to the present invention.

DETAILED DESCRIPTION OF THE PREFERRED EMBODIMENTS

Figure 2:
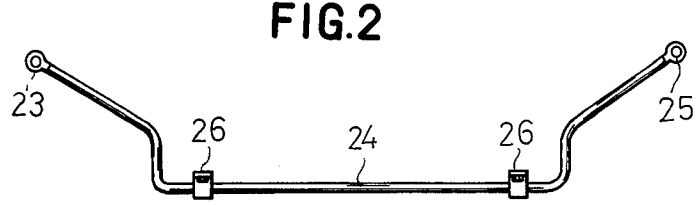
FIG. 2 is a plan view of a torsion bar used with the inventive stabilizer assembly of the present invention.

Referring now to FIG. 1, the vehicle is provided with a so-called independent suspension system including at each side, upper and lower arms 10 and 12, swingably hinged to the frame 14 of the vehicle for pivotally supporting a knuckle spindle 16 to which a front wheel 18 is attached, and a suspension coil spring 20 and a shock absorber 22 interposed between lower arm 12 and frame 14.

As illustrated in FIG. 2, a U-shaped torsion bar 24 is centrally and twistably mounted on frame 14 through the intermediary of a couple of rubber bushings 26.

Torsion bar 24 has one end 23 thereof secured to lower arm 12 on one side through the intermediary of a slidable braking device 30 and the other end 25 is fixed to the opposite lower arm 12 by a bolt assembly 28 of such a length as to keep the device in a neutral position when the vehicle is horizontal or level, as seen in FIG. 1.

Figure 3:
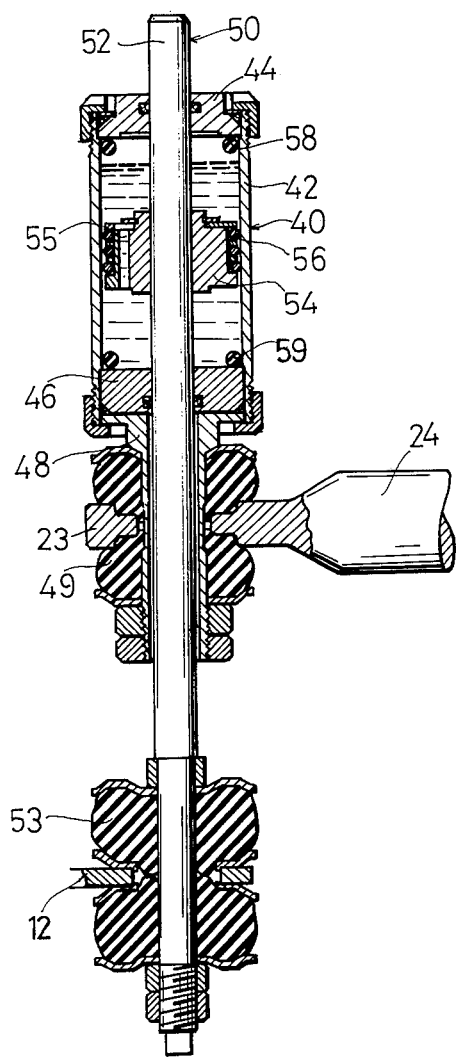
FIG. 3 is an elevation, in section, of a slidable braking device of the friction damper type provided in one embodiment of the stabilizer of the present invention.

Referring now to FIG. 3, slidable braking device 30 consists of cylinder and piston portions 40 and 50. Cylinder portion 40 includes a hollow cylinder 42, top and bottom walls 44 and 46, mounted in an oil-tight manner, on the top and bottom of the hollow cylinder for defining an oil-filled chamber, and a sleeve 48 extending from the bottom wall 46 and threadedly fixed to one end 23 of torsion bar 24 through the intermediary of rubber washers 49.

Piston portion 50 includes a piston rod 52 which extends through the top and bottom walls 44 and 46 in an oil-sealing reciprocal manner, and a piston 54 is press-fitted into piston rod 52. The piston rod has its bottom end threadedly secured to lower arm 12 of the vehicle through the intermediary of rubber washers 53. The piston has a plurality of friction rings 56 fitted in its cylindrical side surface. The friction ring of a split circular spring configuration has an outer diameter slightly larger than the inner diameter of the hollow cylinder 42 so that it resists, with a frictional force, any relative movement of the piston because of its spring-back force which is produced when it is compressed within the hollow cylinder.

Piston 54 has at least one hole 55 bored therethrough so that the oil can flow between the upper and lower chambers within the hollow cylinder as it reciprocates. Accordingly, the oil may be neither pressurized nor resisting movement against the piston, but rather serving as a lubricant and a coolant. The frictional force depends only on the frictional relation between the friction rings 56 and the inner surface of the hollow cylinder 42. Top and bottom rubber rings 58 and 59 are respectively attached to the inside surfaces of the top and bottom walls 44 and 46 for cushioning the piston 54 at the opposite extremities of the stroke thereof.

FIG. 4 shows another slidable braking device of the oil damper type. The cylinder is filled with oil, and the piston has two control valves 57 for the up and down flow of oil. The braking force is generated by said control valves on both side strokes. The stroke of the piston 54 is smaller than the maximum twistable amplitude of the end of the torsion bar 24. In most cases, it may be limited to about 15 mm on both sides from a neutral position. The purpose of this feature is to relieve uncomfortable influences caused by the roughness of the road when the vehicle runs straight, but permitting a slight rolling angle or a small inclination of the car to either side when the car turns. In order to decrease rolling or sway of the vehicle during straight running, it is desirable to reduce the stabilizing action attributed to the deformation of torsion bar 24 which is caused by the wheel passing over raised or hollow places in the road. Although the large raised or hollow places in the road cause the opposite ends of the torsion bar 24 to greatly deform relative to each other, the stroke of the piston 54 will absorb the deformation and consequently relieve the stabilizing force, resulting in maintained comfort.

The stabilizing action of the torsion bar 24 reduces the amount of the rolling angle corresponding to the stroke of the piston 54. For example, in the case of a 1,200 Kg weight class vehicle, a stroke of 15 mm corresponds approximately to a rolling angle of 1 degree or less.

On the other hand, a vehicle, when turning rapidly, may be inclined with a rolling angle of from about 5 degrees to 10 degrees, so that such a stroke may have no substantial effect upon the stabilizing action which is required for turning.

It will be understood that, whenever the stroke is limited in the manner described above, the slidable braking device, according to the present invention, will make the stabilizing action of the torsion bar effective when the vehicle turns, but ineffective when the vehicle runs in a straight path.

The manner of operation of the aforementioned assembly will now be explained. In general, when a steering wheel is suddenly rotated to make a rapid turn, the steering performance depends on the amount of angular acceleration for the transient period of rolling, particularly in the initial time period thereof, or on the same for the period transferring from the rolling state to the level or horizontal state rather than on the amount of rolling angle.

Piston 54 may not actuate by sliding unless the torsional force of the torsion bar 24 exceeds the frictional resistance between friction rings and the inside surface of hollow cylinder 42. Thus, the stabilizing action will not initiate in the beginning of the distortion of the torsion bar 24 and as a consequence, the angular acceleration will not increase for the transient period of rolling, particularly in the beginning thereof.

For example, in the case of 1,200 Kg weight class vehicles provided with a preselected braking force of about 14 Kg, the piston may initially remain stationary until the opposite ends of the torsion bar are distorted to a distance therebetween of at least 10 mm, corresponding to a spring-back force of about 14 Kg.

The value of the frictional or braking force in the inventive assembly is determined by the spring constant of the torsion bar 24 together with the stroke of the piston 54 for absorbing the initial distortion of the torsion bar 24. For example, in the case of 1,200 Kg weight class vehicles, it may be preferable to provide a relatively small braking force of about 10 to 20 Kg together with a stroke of 15 mm.

It will be easily understood that two slidable braking devices as shown in FIG. 3 can be provided at both ends of the torsion bar and that in this case other constructions and the manner of operation are the same as in the case of a single device of FIG. 1, except that the stroke of each piston of both the devices is arranged to be the half of that described above.

Referring now to FIG. 5, there is shown the embodiment wherein slidable braking devices of the dynamic damper type are provided, in which a torsion bar 24 carries near the end thereof a weight 60 secured thereto by set screw 62. In the case of applying slidable braking devices to each end portion of the torsion bar, in place of top rubber ring 58 of FIG. 3, a conical spring 70 is interposed between top wall 44 and piston 54 within hollow cylinder 42. The other elements are the same as illustrated in FIG. 3.

Advantageously, weight 60 is heavier than one-fifth of the braking force as determined in the aforementioned manner. The conical coil spring supports the hanging weight of the stabilizer and normally keeps the piston 54 in a neutral position.

The slidable braking device of FIG. 5 acts as a dynamic damper, somewhat differently from that of FIG.

3, to absorb vibrations in nonspringing portions of the vehicle, such as vibrations in tires in the order of about 10 Hz with small amplitudes, which occur during highway running. This embodiment has the advantage that the wheel vibration may not be transmitted to the frame by the dynamic damping action. The stroke of each device should be determined in the same way as two devices of the frictional damp type at both of the sides thereof. Other features and advantages are similar to that of FIG. 3.

Figure 6:
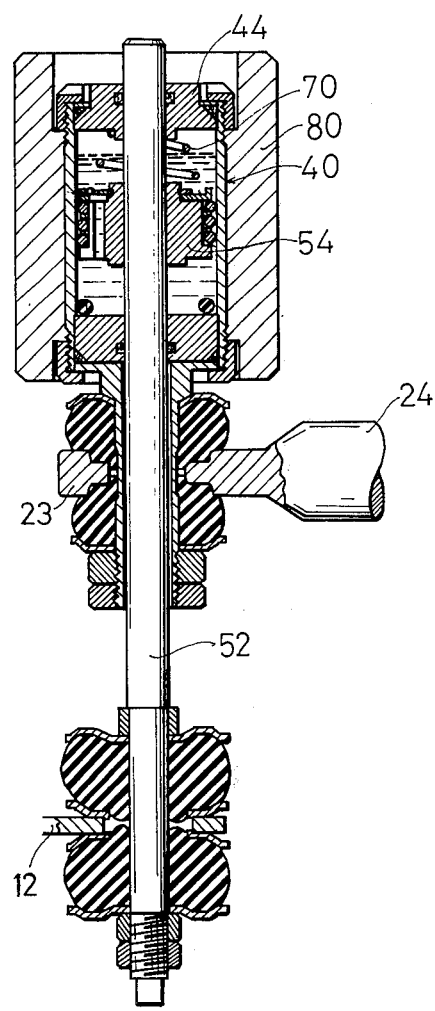

Referring now to FIG. 6, there is provided a modification of the stabilizer assembly, wherein the slidable braking device contains a hollow cylindrical weight 80 fitted about and integral with hollow cylinder 42. Other features and advantages are the same as the embodiment of FIG. 5.

From the foregoing, it will be understood that the inventive stabilizer assembly is effective in its stabilizing action without diminishing the characteristics of an independent suspension system. The characteristic damping force of the shock absorber in the suspension system may be smaller, because the spring constant of the stabilizer bar does not act on the spring constant of the suspension spring. Thus, a reduced transmission of the road shock is obtained. By the use of the stabilizer assembly of the present invention, the vehicle attains a reduced rolling action and less vibration due to the optimum absorbing action and the better roadholding and straight-running characteristics.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is claimed:

1. A stabilizer assembly comprising, in combination, a torsion bar having a central portion and end portions, said central portion being twistably mounted on the frame of a vehicle, and a slidable braking device disposed at least at one end of said torsion bar, said slidable braking device having a slidable cylinder member and a fixed piston member secured, respectively, to the end portion of the torsion bar and the moving portion of the swing arm of the suspension system of the vehicle, said cylinder member and piston members being reciprocal relative to each other under a certain braking force with the stroke thereof being limited to a length smaller than the maximum twistable amplitude of the ends of said torsion bar, the end portions of said torsion bar having such inertias to induce the sliding action of said slidable braking device.

2. The stabilizer assembly according to claim 1, wherein said slidable braking device is a friction damper having said cylinder member and said piston member, said piston member including a friction element pressed against the inner wall of said cylinder.

3. The stabilizer assembly according to claim 1, wherein said slidable braking device is an oil damper comprising said cylinder member adapted to be filled with oil and said piston member, said piston member dividing said cylinder member into separate chambers and said piston member containing two pressure control valves which provide upward oil flow and downward oil flow between said chambers.

4. The stabilizer assembly according to claim 1, wherein at the beginning of the deformation of the torsion bar, the slidable braking device has a braking force greater than the springback force of the torsion bar at its predetermined deformation.

5. The stabilizer assembly according to claim 1, wherein said slidable braking device has a weight disposed on the end of said torsion bar.

6. The stabilizer assembly according to claim 1, wherein a weight is disposed on the member of said slidable braking device.

7. The stabilizer assembly according to claim 1, wherein the stroke is limited to a length of about 10 mm to 20 mm on each side of the neutral position.

8. A stabilizer assembly according to claim 5, wherein said slidable braking devices are fitted to each end portion of the torsion bar, and a spring is arranged to suspend the hanging weight of the torsion bar for maintaing said slidable braking device in a neutral position.

9. A stabilizer assembly according to claim 6, wherein said slidable braking devices are fitted to each end portion of the torsion bar, and a spring is arranged to suspend the hanging weight of the torsion bar for maintaining said slidable braking device in a neutral position.

* * * * *